(12) United States Patent
Lin

(10) Patent No.: US 9,937,690 B2
(45) Date of Patent: Apr. 10, 2018

(54) TWO-STAGE APPLICATION DEVICE FOR INSTALLING SCREEN PROTECTORS AND KIT COMPRISING THE APPLICATION DEVICE

(71) Applicants: COAGENT INTERNATIONAL CO., LTD., Chung-Ho, New Taipei (TW); Chin-Hsin Lin, Chung-Ho, New Taipei (TW)

(72) Inventor: Chin-Hsin Lin, Chung-Ho (TW)

(73) Assignees: COAGENT INTERNATIONAL CO., LTD., New Taipei County (TW); Chin-Hsin Lin

( * ) Notice: Subject to any disclaimer, the term of this patent is extended or adjusted under 35 U.S.C. 154(b) by 82 days.

(21) Appl. No.: 15/218,064

(22) Filed: Jul. 24, 2016

(65) Prior Publication Data

US 2017/0274635 A1 Sep. 28, 2017

(30) Foreign Application Priority Data

Mar. 25, 2016 (TW) .............................. 105109578 A
Jun. 14, 2016 (TW) .............................. 105118483 A

(51) Int. Cl.
*B32B 37/00* (2006.01)
*B32B 39/00* (2006.01)
*G06F 3/041* (2006.01)

(52) U.S. Cl.
CPC .......... *B32B 37/0046* (2013.01); *B32B 39/00* (2013.01); *G06F 3/0412* (2013.01); *G06F 2203/04103* (2013.01); *G06F 2203/04107* (2013.01)

(58) Field of Classification Search
CPC ............ B32B 37/0046; B32B 2037/10; B32B 2037/109; B32B 2307/584; B32B 2457/202; B32B 2457/20; B32B 2457/208; B29C 63/0004; B29C 63/00; B29C 63/0073; G06F 2203/04103; Y10T 156/1741; Y10T 156/17; H04B 1/3888; H04B 1/3877; B29L 2031/3437; B29L 2031/3475
USPC ................ 156/580, 581, 555, 538, 540, 391
See application file for complete search history.

(56) References Cited

U.S. PATENT DOCUMENTS

2014/0338829 A1* 11/2014 Peng .................... B29C 63/0004
156/249
2015/0107767 A1* 4/2015 Wadsworth ......... B29C 63/0004
156/324

* cited by examiner

*Primary Examiner* — Philip C Tucker
*Assistant Examiner* — Jimmy R Smith, Jr.

(57) ABSTRACT

A two-stage application device is disclosed for installing a screen protector on a display screen of a screen-mounted device. The application device includes a base, a first actuating lever, and a second actuating lever. The base includes an accommodation and a support, wherein the support defines first grooves and second grooves. The first actuating lever has first controlled pivot portions guided and limited by the first grooves, a first pressing portion, a first arm, and a body with a positioning protrusion. The second actuating lever has second controlled pivot portions guided and limited by the second grooves, a second pressing portion, a second arm, and a body. A kit is also disclosed for protecting a display screen of a screen-mounted device, which includes a two-stage application device, and at least one screen protector including a protective film with at least one adhesive layer, and a backing sheet.

12 Claims, 11 Drawing Sheets

TWO-STAGE APPLICATION DEVICE FOR INSTALLING SCREEN PROTECTORS AND KIT COMPRISING THE APPLICATION DEVICE

FIELD OF THE INVENTION

The present invention relates to an application device for installing screen protectors and, more particularly, to a two-stage application device for installing screen protectors.

BACKGROUND OF THE INVENTION

Rapid development of display technology originates in life need. Today, display devices have been widely applied to various equipment, such as televisions, computer monitors, smart phones, tablet computers, etc, for showing visual images dynamically. In addition, touch screen technology has been used to electronic devices for achieving intuitive two-way communication these days. However, frequent use of a touch screen may cause abrasion of the screen surface. To solve this problem, screen protectors are usually employed to isolate the touch screen so as to prevent the abrasion due to finger contact. Thus, how to apply a screen protector to a visual image zone in a rapid and accurate manner has become a topic that deserves our attention and investigation.

Generally, a conventional screen protector is provided with a backing sheet for isolating the adhesive on its film body. The backing sheet remains until the screen protector is applied to a visual image zone of a device. Usually, the conventional screen protector is installed in a manual way. After the backing sheet is peeled off by grasping its one end, the user may gradually attach the film body to the entire visual image zone with his or her naked eyes monitoring the attachment process. If careless, bubbles may be trapped between the film body and the visual image zone or the film body may not be aligned with the visual image zone properly. Since electronic devices, such as smart phones, tablet computers, desktop computers, and small televisions, have a need to be installed with a screen protector, for convenience of illustration, the forgoing devices containing visual image zones are referred to as "screen-mounted devices", and the visual image zones are term as "screen displays".

For reducing the non-alignment problem and bubbles trapped in a screen protector, some vendor proposed a method for applying a screen protector to a screen-mounted device, wherein the screen protector, including a film body and a backing sheet, is first aligned with a screen-mounted device, and then the screen protector is fixed to the one side of the screen-mounted device using a tape, after which the backing sheet can be removed to have the film body of the screen protector attached to the display screen of the screen-mounted device. However, this method may consume a lot of time, and cannot avoid relative movement between the screen protector and the screen-mounted device during the process of removing the backing sheet. Besides, during the process of attaching the film body to the screen-mounted device, the user should repeatedly squeeze the film body to prevent bubble trapped under the film body.

To facilitate the operation of installing a screen protector, some vender provides an application device to assist the installation. The application device employs a fixed seat in cooperation with a movable holder, and a screen protector with an extended backing sheet. In operation, a screen-mounted device is placed on the movable holder, and one end of the extended backing sheet is fixed to the seat. Next, the user may pull a knob to have the movable holder retracted, during which the backing sheet can be gradually removed from the film body of the screen protector, and the screen-mounted device is transported deep into the fixed seat, where the pressing element of the fixed seat can squeeze the film body, so that the film body can be attached to the display screen of the screen-mounted device. Although the application device allows a user to conduct an attachment process more easily, the attachment process is completed in the deep of the fixed seat. Under this circumstance, the user cannot monitor the details of the attachment process immediately; therefore, the screen protector may be not aligned with the screen-mounted device properly. Besides, the application device is very heavy and thus has difficulty in storage or transportation, the operation is laborious, and the use of the extended backing sheet for the screen protector is uneconomical and not environmentally friendly.

In view of the foregoing, there is a need to provide an improved application device that can be operated more easily to conduct an attachment process without compromising the accuracy of aligning a screen protector with a screen-mounted device, and is simple in structure to reduce the weight and to lower the manufacturing cost. With the improved application device, screen protectors can be applied onto screen-mounted devices more properly, and the working efficiency can be increased.

SUMMARY OF THE INVENTION

One object of the present invention is to provide a two-stage application device, which allows a user to monitor an attachment operation in real time to prevent the attachment operation from a risk of non-alignment, thus increasing the accuracy of installing a screen protector.

Another object of the present invention is to provide a two-stage application device, which is small in size and can be transported and operated easily.

A further object of the present invention is to provide a two-stage application device, which includes two actuating levers each having a pressing portion, which can remove the backing sheet of a screen protector and attach the film body of the screen protector at the same time, so as to facilitate positioning and attaching the screen protector and to increase the efficiency of installing the screen protector.

A still further object of the present invention is to provide a kit, which includes a two-stage application device and a screen protector for offering a total solution for protecting the display screen of a screen-mounted device, whereby the accuracy, efficiency, and convenience of conducting an attachment operation can be increased.

In conclusion, the present invention discloses a two-stage application device for installing screen protectors, which allows a user to monitor an attachment process in real time to reduce the risk of incorrect attachment, and to increase the accuracy of positioning a screen protector; furthermore, the volume of the application device can be reduced for ease of carrying and mounting; furthermore, the pressing portions of the actuating levers can remove the backing sheet of a screen protector and attach the film body of the screen protector to a screen-mounted device at the same time, so as to facilitate positioning and attaching the screen protector and to increase the efficiency of installing the screen protector; furthermore, the present invention provides a kit including an application device and a screen protector, which offers a total solution for protecting the display screen of a screen-mounted device, whereby the accuracy, efficiency, and convenience of conducting an attachment operation can be increased.

BRIEF DESCRIPTION OF THE DRAWINGS

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

Figure 1:
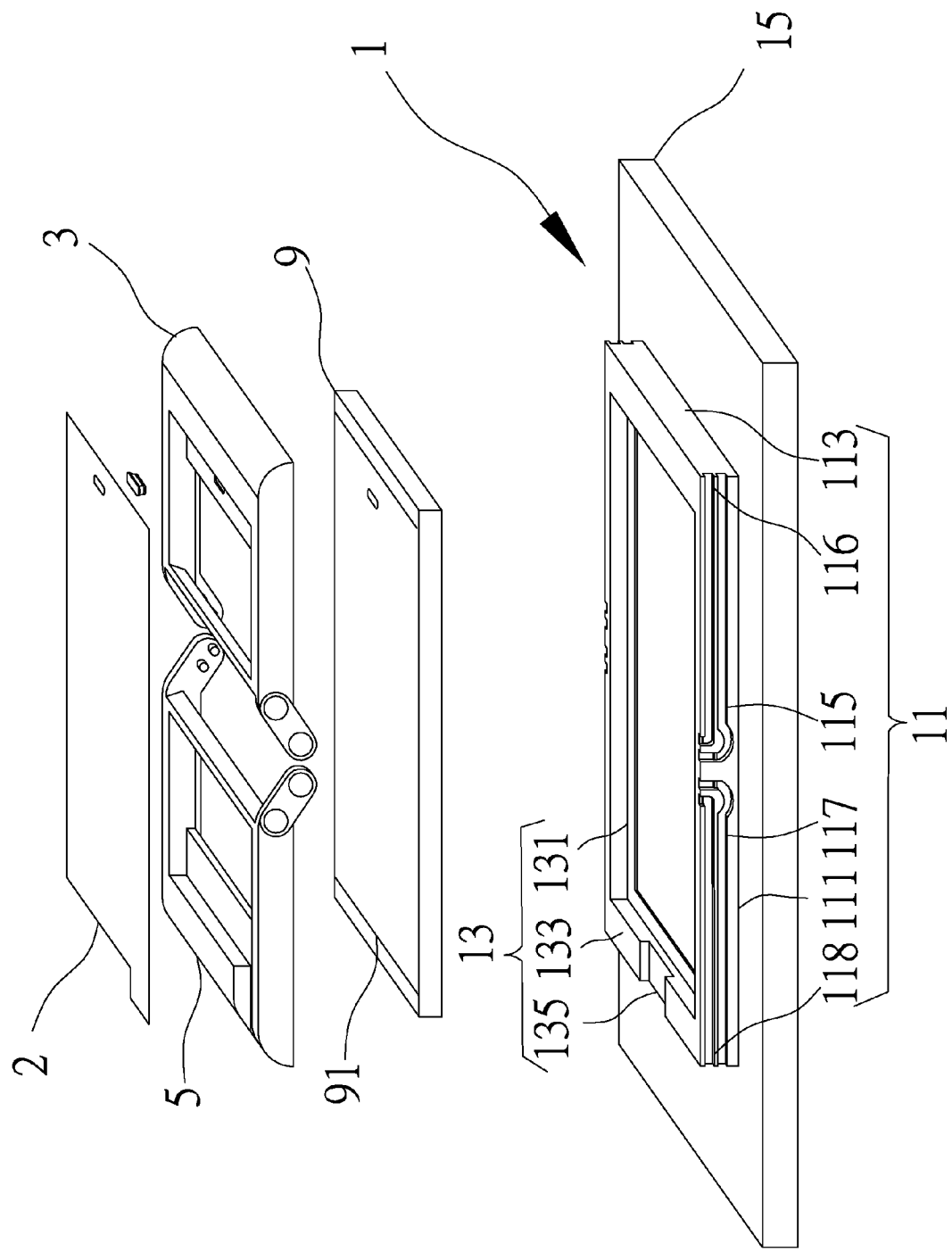
FIG. 1 shows an exploded view of a kit according to a first embodiment of the present invention, which generally includes a screen protector, and a two-stage application device including a first actuating lever, a second actuating lever, and a base.

The foregoing and other technical contents, features and advantages of the present invention will be illustrated in detail by way of exemplary embodiments with reference to the accompanying drawings. In the exemplary embodiments, same elements will be indicated by similar numerals or labels.

FIGS. 1 through 12 show a kit according to a first embodiment of the present invention, which includes an application device and a screen protector 2. As shown, the application device employs a base 1 in cooperation with a first actuating lever 3 and a second actuating lever 5 to have the screen protector 2 attached to the display screen 91 of a smart phone 9. In this embodiment, the display screen 91 of the smart phone 9 is flat; namely, it does not contain a curvature.

Furthermore, the base 1 generally includes a support 11, an accommodation 13, and a bottom plate 15. The support 11 has a pair of opposite longer sides 111 and a pair of opposite shorter sides 113. The opposite longer sides 111 defines a pair of first grooves 115, each defining an exit 116 close to one end of one of the short sides 113, and defines a pair of second grooves 117, each defining an exit 118 close to one end of the other one of the short sides 113, wherein the second grooves 117 are in parallel with and in level with the first grooves 115, so that the second grooves 117 and the exit 118 are arranged in mirror symmetry with the first grooves 115 and the exit 116, about middle portions of the longer sides 111. Also, the accommodation 13 defines a recessed space 131 and has a top surface 133 above the support 11, and defines an indentation 135 at the top surface 133 to assist a user in grasping an electronic device, such as the smart phone 9, for taking it from the accommodation 13.

Figure 2:
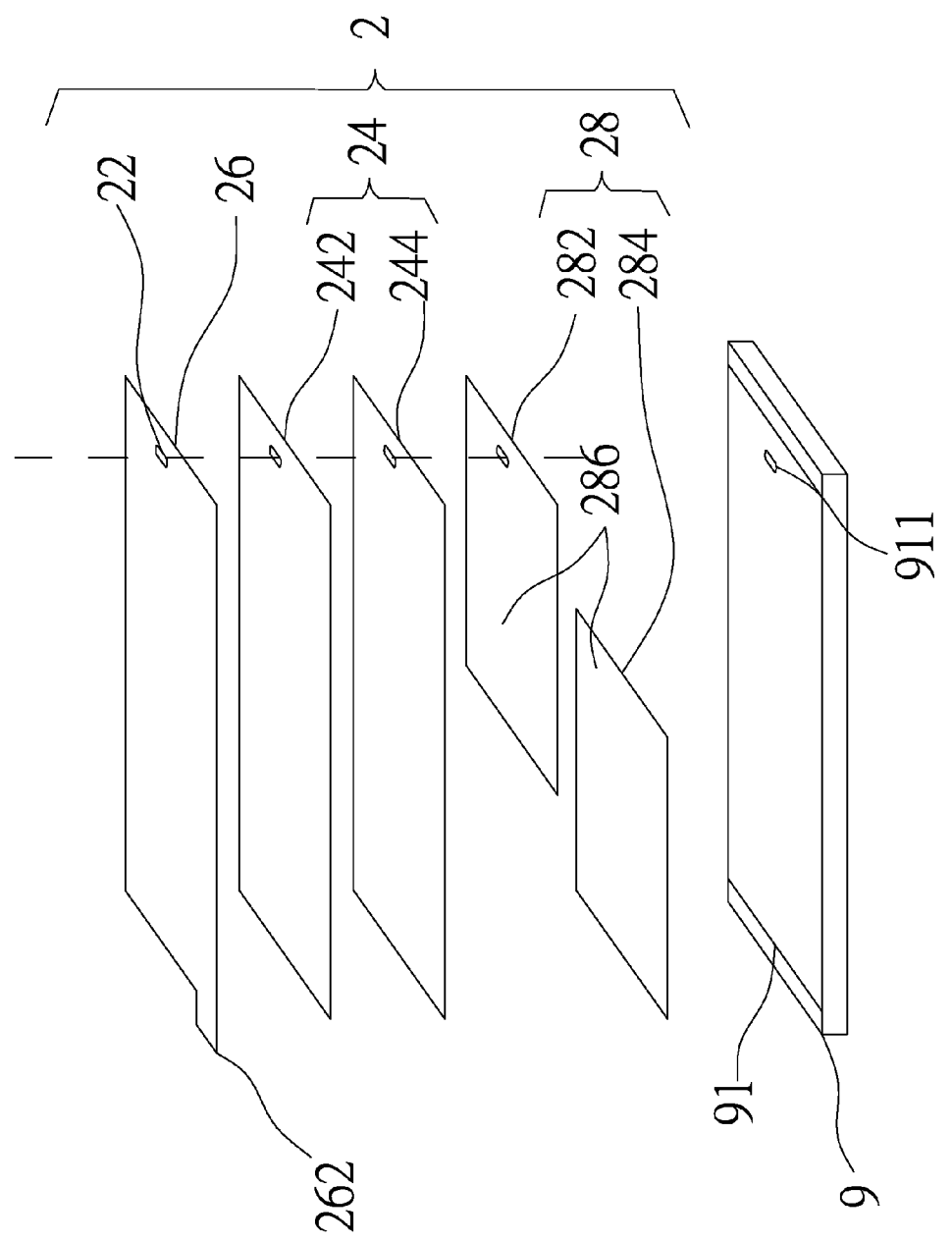
FIG. 2 shows an exploded view of the screen protector shown in FIG. 1.

As shown in FIG. 2, the screen protector 2 can be made in a size according to the display screen of an electronic device to be protected. Since the smart phone 9 has an earpiece unit 911 at the top portion of its display screen 91. For prevention of covering the earpiece unit 911 provided on the smart phone 9, the screen protector 2 defines an opening 22, at a corresponding location, slightly greater than the earpiece unit 911. Specifically, the screen protector 2 includes a protective film 24 including a flexible film body layer 242 and an adhesive layer 244 uniformly disposed on the undersurface of the film body layer 242, wherein the film body layer 242 can be made of polyurethane (PU), and the adhesive layer can be polyurethane glue.

Of course, in this embodiment, although the flexible film body is made of PU material, one skilled in the relevant art may know that other flexible materials, such as acrylic material or silicone, can be used to make a film body with flexibility.

Furthermore, an insulation sheet 26 can be provided on the other surface of the protective film 24 through electrostatic force to prevent the protective film 24 from contamination or abrasion before application of the screen protector 2, wherein the insulation sheet 26 can be provided with a tab 262 to facilitate removing the insulation sheet 26 after the screen protector 2 has been applied to the display screen of a screen-mounted device. Furthermore, the protective film 24 can be provided with a backing 28, which includes a first backing sheet 282 and a second backing sheet 284, both of which can be attached to the adhesive layer 244 provided at the undersurface of the film body layer 242, without substantial overlap. Each of the first and second backing sheets 282, 284 can be coated with a low-adhesion material layer 286, such as polytetrafluoroethylene (PTEF, one type of fluroresin), at one side close to the adhesive layer 244 so as to reduce the bonding strength between the backing 28 and the protective film 24, so that the backing 28 can be peeled off more easily for application of the screen protector 2.

Figure 3:
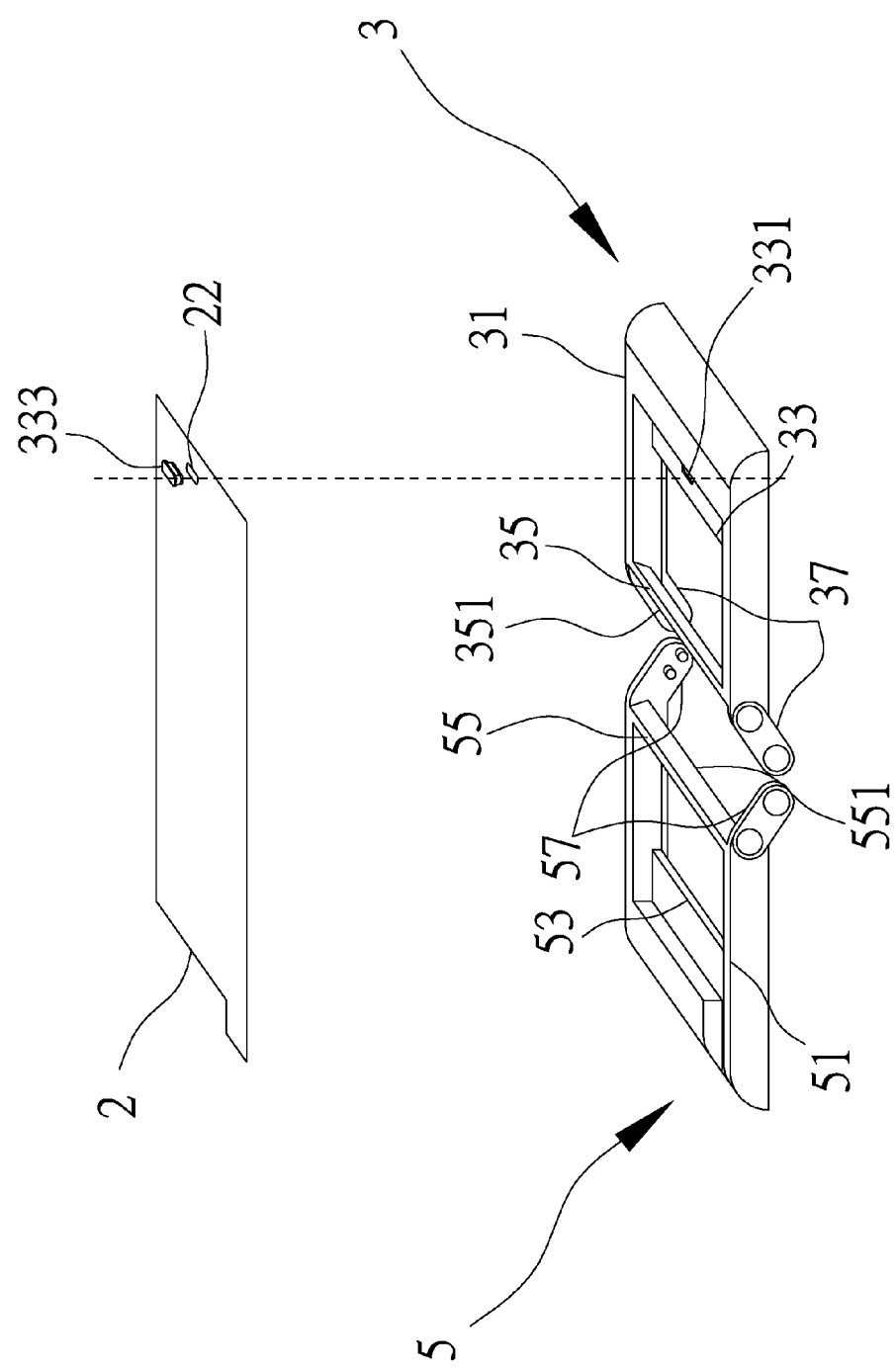
FIG. 3 shows a 3-dimensional view of the first actuating lever and the second actuating lever of the application device, and the screen protector shown in FIG. 1.

As shown in FIG. 3, the first actuating lever 3 generally has a first arm 31 provided with a body 33 that defines a positioning hole 331. A positioning member 333 can be inserted into the positioning hole 331. Also, the first arm 31 has a first pressing portion 35 which is formed integrally with the first arm 31 at two ends thereof. The pressing portion 35 has a contact surface 351, which can be brought in contact with one half of the screen protector 2. The first arm 31 is provided with a pair of first controlled pivot portions 37 at its two ends.

Furthermore, the second actuating lever 5 generally has a second arm 51 provided with a body 53, and has a second pressing portion 55 which is formed integrally with the second arm 51 at two ends thereof. The second pressing portion 55 has a contact surface 551, which is flat as the contact surface 351 of the first pressing portion 35 and can be brought in contact with the other half of the screen protector 2. The second arm 51 is provided with a pair of second controlled pivot portions 57 at its two ends.

Figure 4:
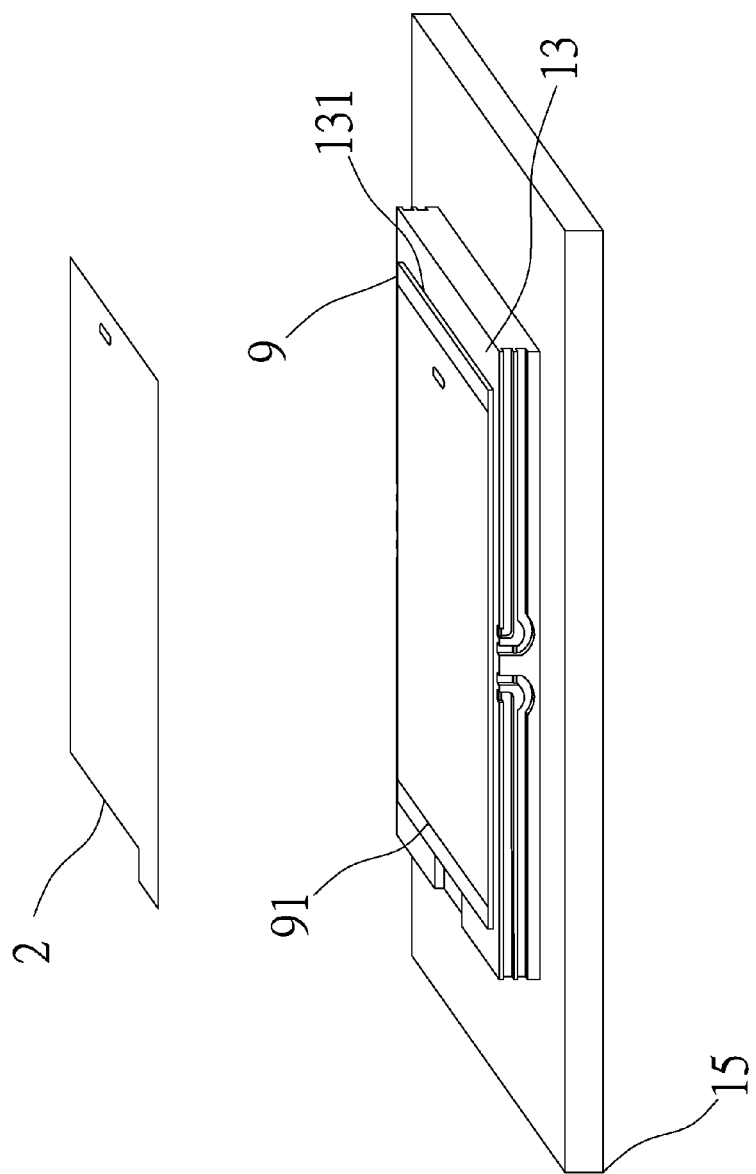
FIG. 4 shows a 3-dimensional view of the screen protector, the base of the application device, and a smart phone placed on the base.

The operation of the kit of the present invention, which can be roughly divided into two stages, including assembly procedure and subsequent attachment procedure, is given in the following paragraphs. Regarding the assembly procedure, as shown in FIG. 4, the smart phone 9, with its display screen 91 facing upwardly, is first placed in the recessed space 131 of the accommodation 13 of the base 1. In this embodiment, the recessed space 131 is configured according to the smart phone 9, so that the smart phone 9 can be held properly; alternatively, the recessed space 131 can be designed in a way suitable for various types of electronic devices with display screens. For increasing the stability of the base 1, a heavy plate, such as the bottom plate 15, can be provided under the support 11 to facilitate installing the screen protector 2.

Figure 5:
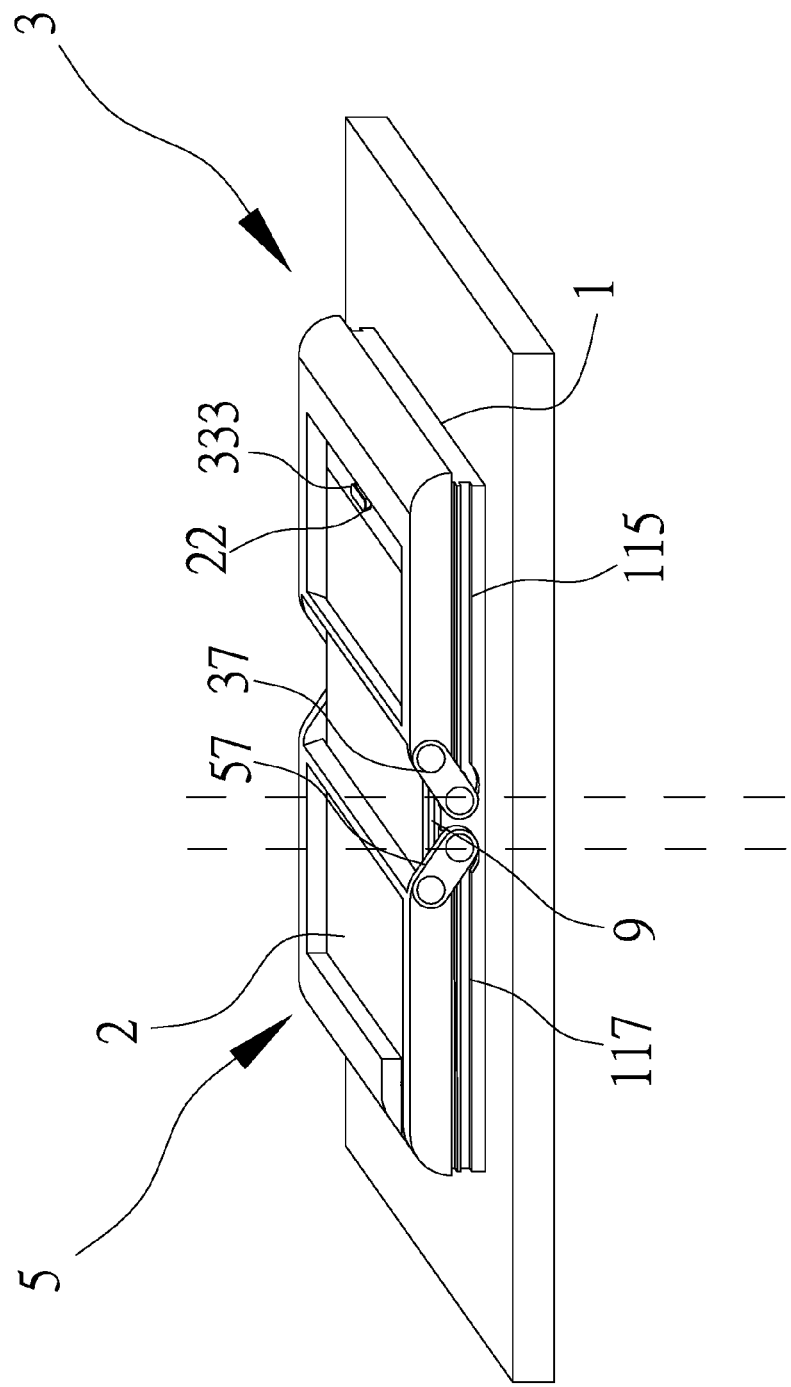
FIG. 5 shows a 3-dimensional view of the screen protector, the smart phone, the first actuating lever, the second actuating lever, and the base being assembled to form the application device.

Next, referring to FIGS. 3 and 5, the positioning member 333 is inserted into the opening 22 of the screen protector 2 and the positioning hole 331 of the body 33 of the first actuating lever 3 to allow one side of the screen protector 2 to be fixed onto the first actuating lever 3, and the other side of the screen protector 2 opposite to the opening 22 is placed on the body 53 of the second actuating lever 5. As such, a preliminary assembly of the first actuating lever 3, the second actuating lever 5, and the screen protector 2 is completed, wherein the first actuating lever 3 and the second actuating lever 5 are located horizontally, and the first controlled pivot portions 37 and the second pivot portions 57 face each other.

The preliminary assembly of the first actuating lever 3, the second actuating lever 5 and the screen protector 2 needs to be assembled to the base 1 which contains the bottom plate 15 and has accommodated the smart phone 9. Now, the first controlled pivot portions 37 can be aligned with the first grooves 115 and the second controlled pivot portions 57 can be aligned with the second grooves 117 to allow the pivot portions 37, 57 to be fitted downwardly into the first and second grooves 115, 117, respectively, as shown in FIG. 5, thus completing a final assembly.

After all components of the application device have been assembled, the attachment procedure, i.e. application of the screen protector 2 to the smart phone 9, can be initiated. Referring to FIGS. 6 through 11, various positions of each of the actuating levers 3, 5 are shown, wherein a hidden line indicates a previous position, a solid line indicates a later position, and a dotted line with an arrowhead indicates a moving direction.

Figure 6:
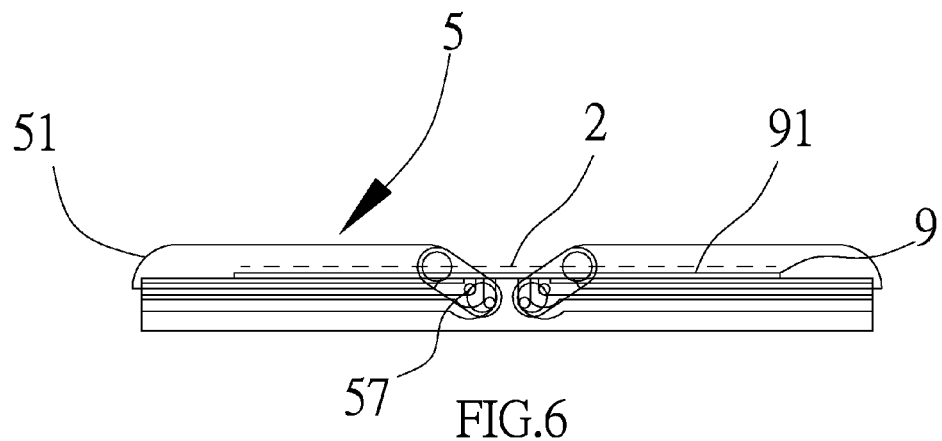
FIGS. 6 through 11 show front schematic views of various operational statuses of the application device.
Figure 7:
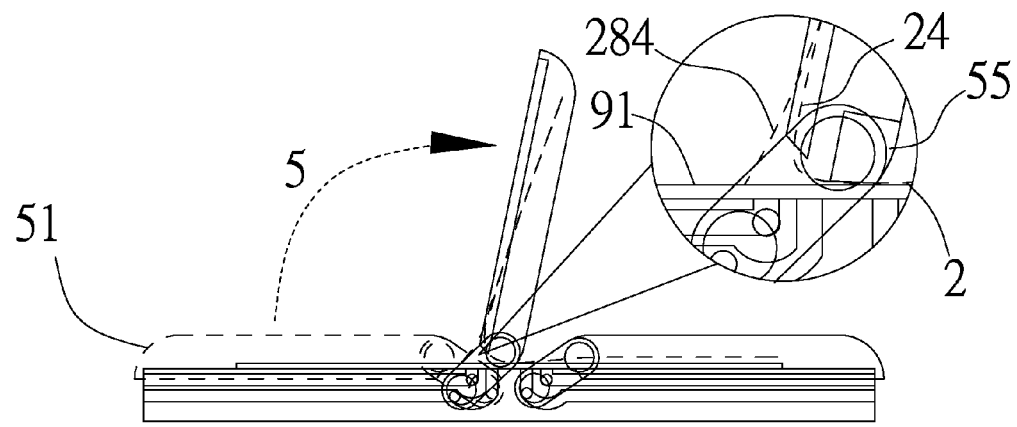

In this embodiment, the attachment procedure should begin at the second actuating lever 5, which is initially located in its stop position as shown in FIG. 6. The second actuating lever 5 is rotated clockwise at an angle greater than 90 degrees, with the second controlled pivot portions 57 as a center or axis, to reach its actuation position (see FIG. 7), where the second pressing portion 55 is brought in slight contact with the screen protector 2 located on the display screen 91 of the smart phone 9, and thus the screen protector 2 is urged to contact the display screen 91. Under this circumstance, the protective film 24 and the second backing sheet 284 of the screen protector 2 have been twisted in a large amount. Since the shear stress, which is caused by the twisting, acting on the second backing sheet 284 is greater than the bonding strength between the second backing sheet 284 and the adhesive layer (not shown) of the protective film 24, the second backing sheet 284 can be gradually separated from the adhesive layer of the protective film 24.

Figure 8:
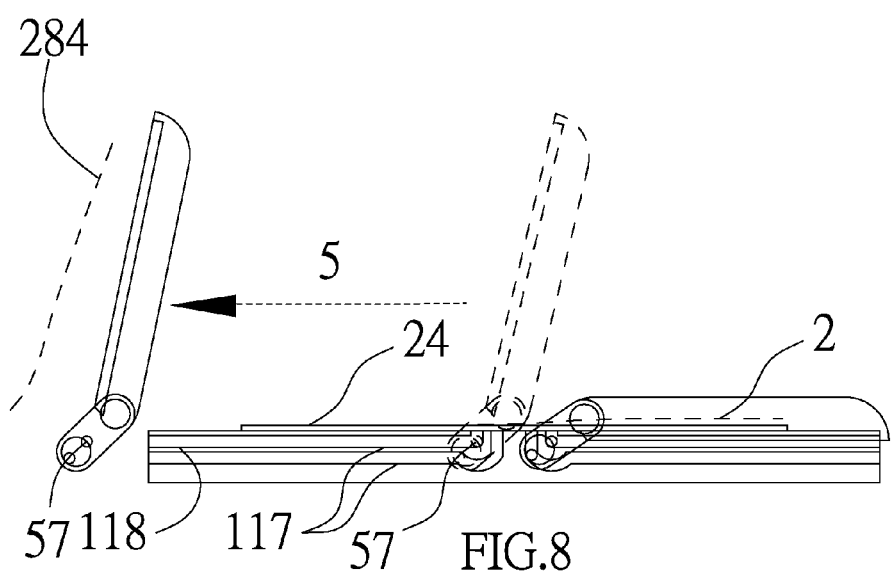
Figure 9:
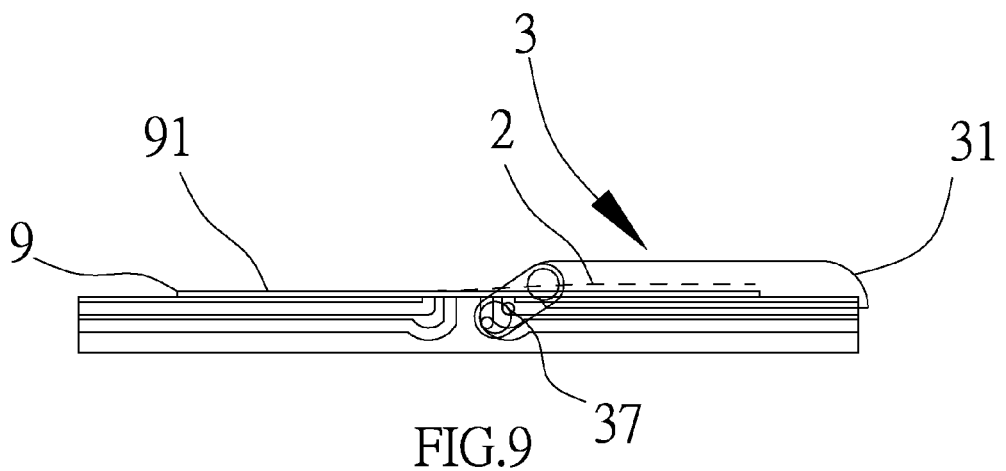
Figure 10:
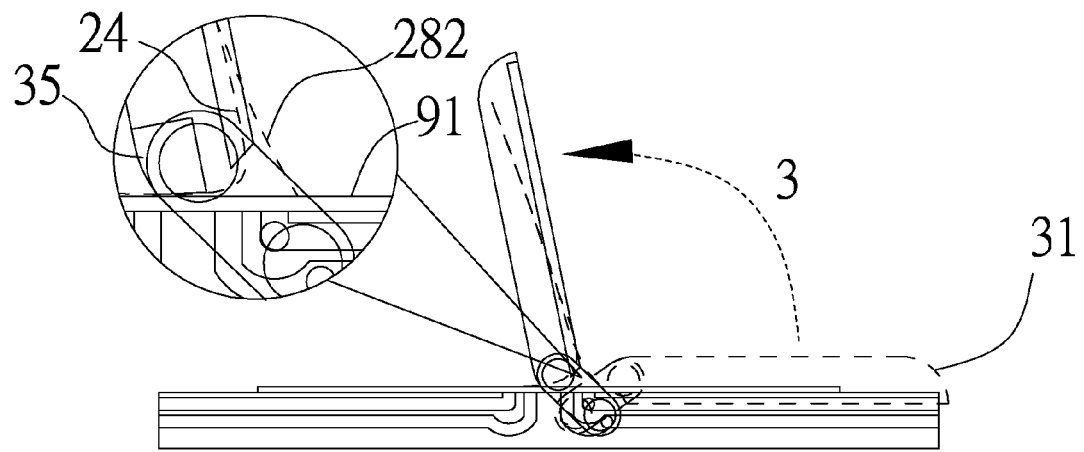
Figure 11:
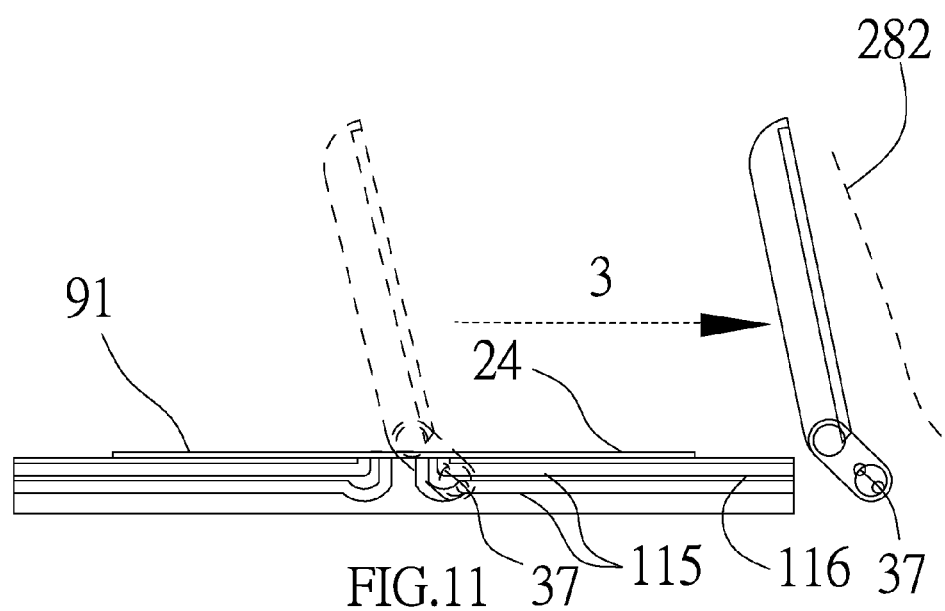

As shown in FIG. 8, when the lower portion of the second backing sheet 284 has been separated from the protective film 24, the second actuating lever 5, which is at its actuation position, can be pressed slightly and pushed leftward to move along the second grooves 117 until the second controlled pivot portions 57 have escaped from the exits 118 of the second grooves 117. As such, the left half of the protective film 24 can be firmly attached to the display screen 91 of the smart phone 9, and the second backing sheet 284 can be totally removed from the protective film 24.

Next, the positioning member 333 has to be removed from the opening 331 of the first actuating lever 3 for continuing the attachment process. The first actuating lever 3, which is initially located in its stop position (see FIG. 9), is rotated counter-clockwise at an angle greater than 90 degrees, with the first controlled pivot portions 37 as a center or axis, to reach its actuation position (see FIG. 10), where the first pressing portion 35 is brought in slight contact with the protective film 24 located on the display screen 91 of the smart phone 9, and thus the protective film 24 is urged to contact the display screen 91. Under this circumstance, the lower portion of the first backing sheet 282 has been separated from the protective film 24. Then, the first actuating lever 3 is pushed rightward to move along the first grooves 115 until the first controlled pivot portions 37 have escaped from the exits 116 of the first grooves 115. As such, the first backing sheet 282 can be totally removed from the protective film 24, and thus the protective film 24 can be entirely attached to the display screen 91 of the smart phone 9.

Figure 12:
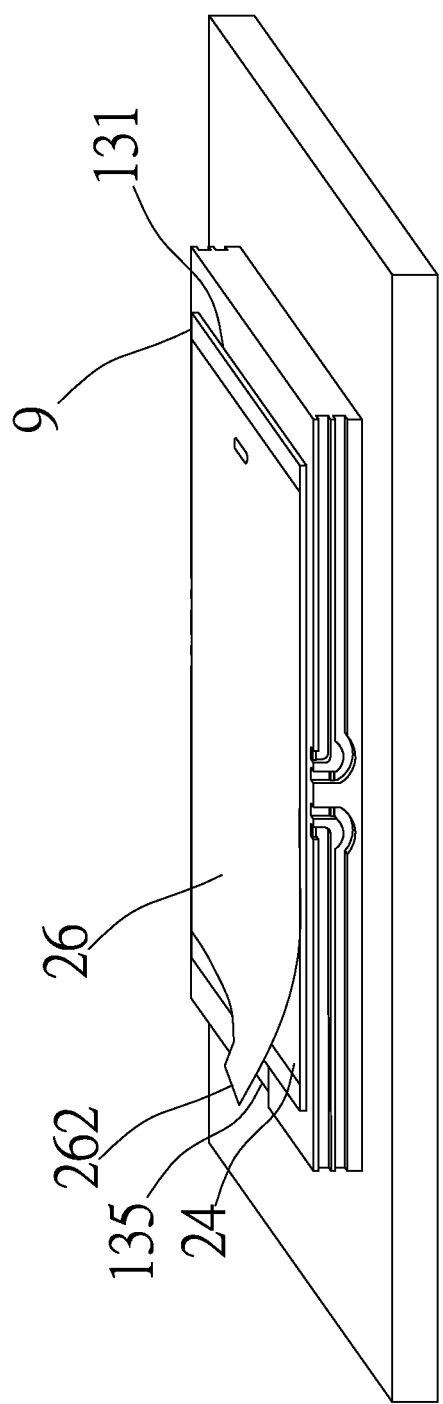
FIG. 12 shows a 3-dimensional view of the final status of the application device, wherein the first actuating lever and the second actuating lever have escaped from the base.

After the attachment process has been completed, as shown in FIG. 12, the insulation sheet 26 can be removed from the protective film 24 by grasping the tab 262 and taking it from left to right to expose a new, smooth surface of the protective film 24, thus completing the application of the screen protector 2. Finally, the user can take the smart phone 9 out of the recessed space 131 via the indentation 135.

Figure 13:
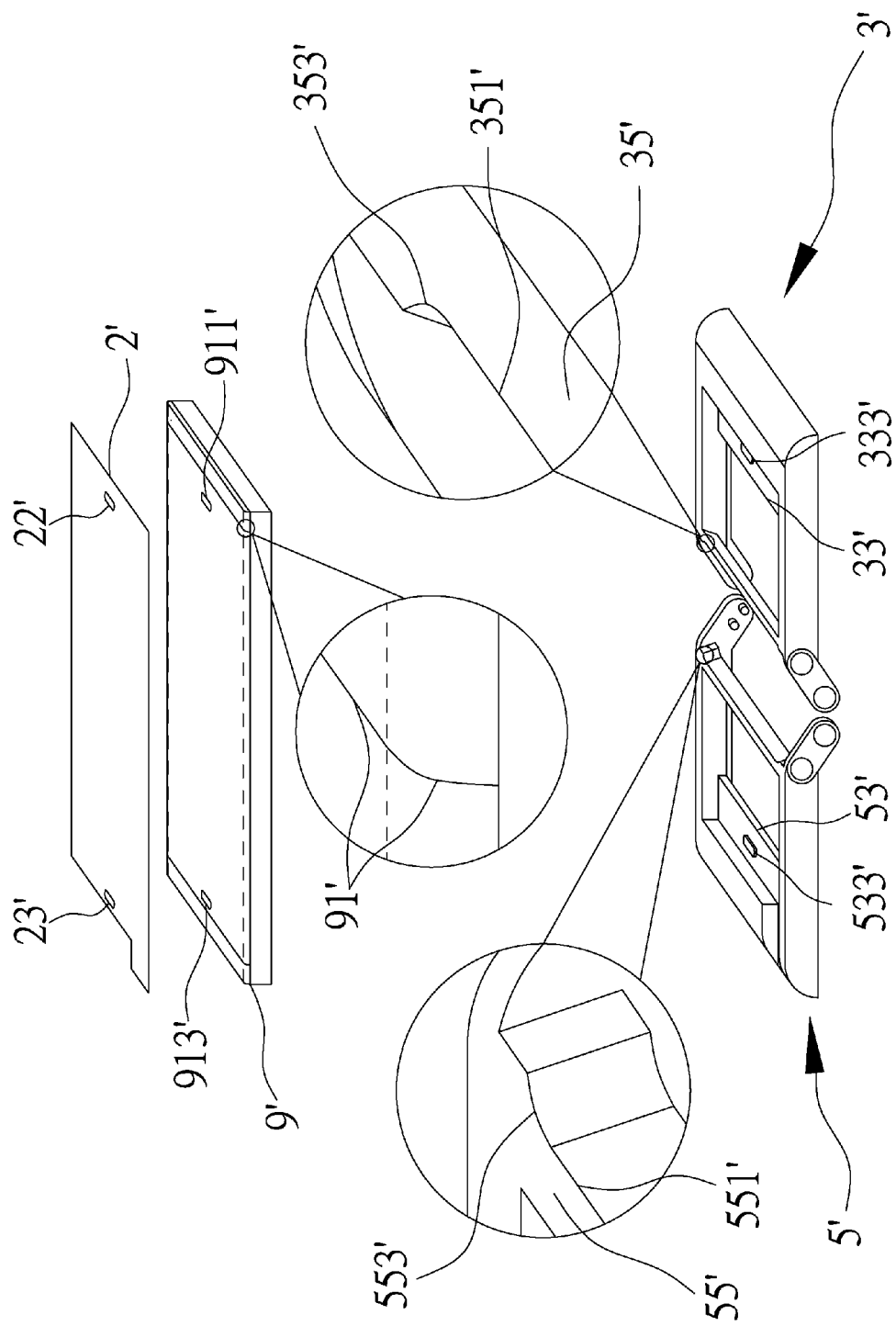
FIG. 13 shows an exploded view of a kit according to a second embodiment of the present invention, wherein the first actuating lever and the second actuating lever are structured to be suitable for a screen-mounted device having a display screen with curved edges.

Since the appearances of smart phones are being constantly updated, some smart phones may have display screens that are not flat at all, wherein curvatures exist in edges of the display screens. For being suitable to this type of screen-mounted device, a second embodiment of the present invention will be illustrated below (see FIG. 13). In the following paragraphs, the structural features of the second embodiment same or similar to those of the first embodiment will not be described in detail, but distinctive structural features existing in the second embodiment will be illustrated in more detail. In FIG. 13, in addition to the earpiece unit 911' provided on the display screen 91' of the smart phone 9', there is provided a microphone unit 913' on the display screen 91' opposite to the earpiece unit 911'. For being suitable to this type of smart phone, the screen protector 2', the first actuating lever 3', and the second actuating lever 5' are required to include features which are not contained in the first embodiment.

Hence, for the display screen 91' with curved edges, the first pressing portion 35' of the first actuating lever 3' and the second pressing portion 55' of the second actuating lever 5' has to be structured according the curved edges of the display screen 91', wherein the first pressing portion 35' is provided with a flat contact surface 351' and two downwardly curved surfaces 353' at two opposite sides of the flat contact surface 351', and the second pressing portion 55' is provided with a flat contact surface 551' and two downwardly curved surfaces 553' at two opposite sides of the flat contact surface 551'. The downwardly curved surfaces 353', 553' are configured to conform to the curved edges of the display screen 91'.

Furthermore, due to the display screen 91' of the smart phone 9' including the earpiece unit 911' and the microphone unit 913', the screen protector 2' has to define two openings 22', 23' respectively corresponding to the earpiece unit 911' and the microphone unit 913' for being applied to the smart phone 9' without covering the two units 911', 913'. To simplify the construction of the application device and its application, the first actuating lever 3' is provided with a first positioning protrusion 333' extending upwardly from the body 33' of the first actuating lever 3', corresponding to the opening 22' of the screen protector 2'; the second actuating lever 5' is provided with a second positioning protrusion 533' extending upwardly from the body 53' of second actuating lever 5', corresponding to the opening 23' of the screen protector 2'. Both of the first and second positioning protrusions 333', 533' can be used as reference points to facilitate positioning the screen protector 2'

Due to structural difference in some aspects, the operation of the second embodiment is somewhat different than that of the first embodiment in which the preliminary assembly of the first actuating lever 3, the second actuating lever 5, and the screen protector 2 requires the positioning member 333 to be inserted into the opening 22 and the positioning hole 331 of the first actuating lever 3, as shown in FIG. 5. In the second embodiment, since the screen protector 2' defines the two openings 22', 23' respectively at its top and bottom, before fitting the screen protector 2' on the first and second actuating levers 3', 5', the two openings 22', 23' has to be aligned with the first positioning protrusion 333' and the second positioning protrusion 533', respectively, so that the two opening 22', 23' can fit over the first and second positioning protrusions 333', 533', thus completing a preliminary assembly of the first actuating lever 3', the second actuating lever 5', and the screen protector 2'.

The attachment procedure of the second embodiment is same as that of the first embodiment as shown in FIGS. 6 through 11. Since both of the first and second positioning protrusions 333', 533', which serves as reference points, can be used to fix the top and bottom portions of the screen protector 2', respectively, there is no specific order for operating the first actuating lever 3' and the second actuating lever 5'; namely, either of the first actuating lever 3' and the second actuating lever 5' can be started first. Nevertheless, once one actuating lever is started, before the actuating lever has finished its operation, the other actuating lever cannot be started.

The above two embodiments can provide a convenient means for an end user or a professional who requires application of screen protectors in small amount, without worrying about involving with complicated operations or the cost. However, for a professional requiring a large-scale operation of the screen protectors, it is preferred that the first and second actuating levers are not entirely separated from the base when completing an operation of attaching a screen protector, and the actuating levers can return to their original positions after completing their attachment operations.

Figure 14:
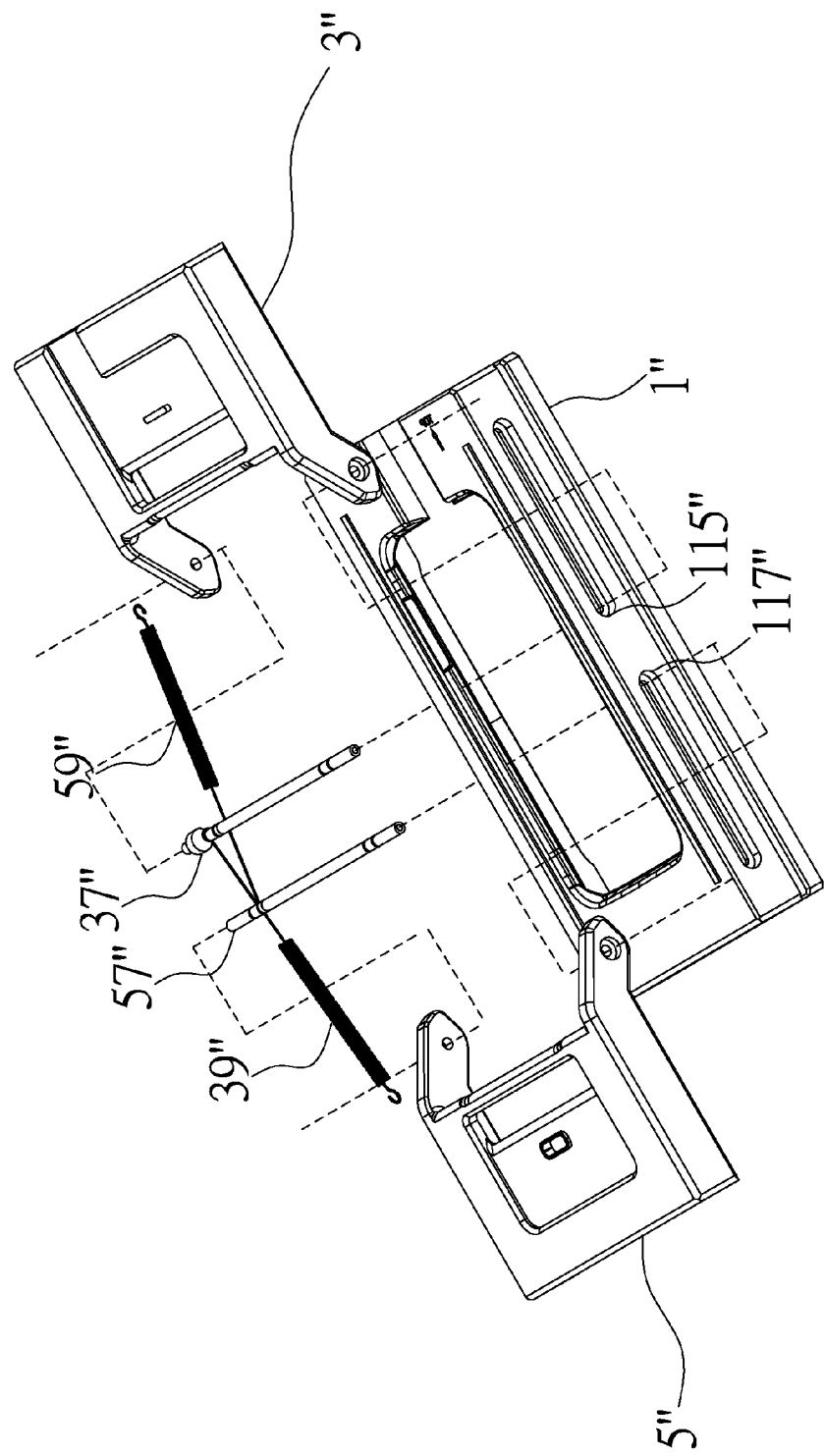
FIG. 14 shows an exploded view of an application device according to a third embodiment of the present invention, wherein a first returning mechanism and a second returning mechanism relative to other components are shown.

FIG. 14 shows an application device according to a third embodiment of the present invention, wherein the first actuating lever 3" is provided with a first returning mechanism connected to the first controlled pivot portions 37". In this embodiment, the first returning mechanism includes a first spring 39", which allows the first actuating lever 3" to return to its original position (stop position) after completing its attachment operation. Of course, the second actuating lever 5" is provided with a second returning mechanism, which includes a second spring 59" being similar to the first spring 39". The second returning mechanism is connected to the second controlled pivot portions 57". In this embodiment, since the first actuating lever 3" and the second actuating lever 5" are respectively connected with the first spring 39" and second spring 59", so that the actuating levers 3", 5" would not separate from the base 1". There is no need to provide the grooves 115", 117" with exits as provided in previous embodiments.

Since a professional may frequently apply screen protectors to screen-mounted devices, it is preferred that the base 1" further includes a heavy metal plate (not shown), and the accommodation of the base 1" can be adjusted or replaced, so that the base 1" can be applied to various types of electronic devices with display screens, such as smart phones or tablet computers, for installing screen protectors, and thus the application device can be operated more flexibly and conveniently.

A fourth embodiment of the present invention is given in the following paragraphs. Since most of the components of the fourth embodiment have similar structures and are operated in a similar manner with the first embodiment, only different parts will be illustrated in detail.

Figure 15:
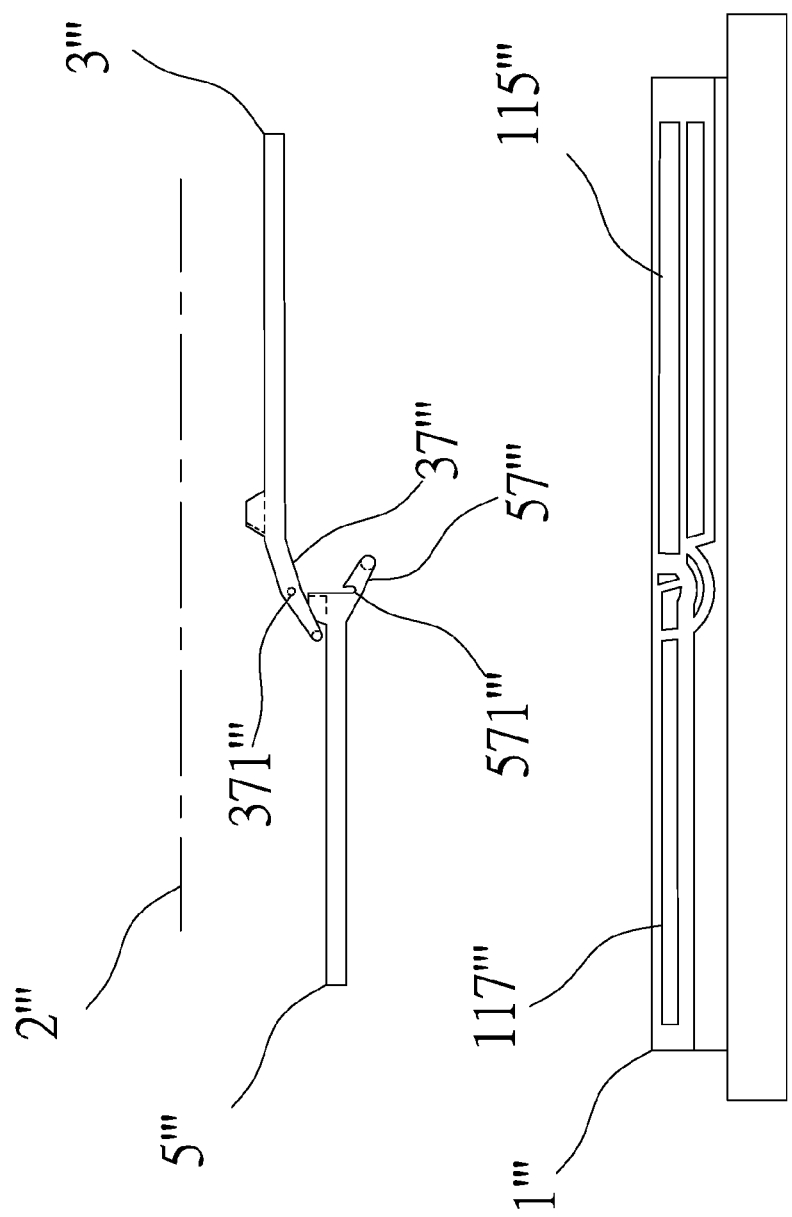
FIG. 15 shows an exploded view of an application device according to a fourth embodiment of the present invention, wherein the relationship between a first connection portion, a second connection portion, and a base are shown.

As shown in FIG. 15, the primary difference between this embodiment and the first embodiment is that the first controlled pivot portion 37''' has a first connection portion 371''', and the second controlled pivot portion 57''' has a second connection portion 571'''. In the assembly procedure of this embodiment, the first actuating lever 3''' and the second actuating lever 5''' have to be interlocked by the first connection portion 371''' and the second connection portion 571'''. Next, the screen protector 2''' is incorporated into the interlocked actuating levers 3''', 5'''. Finally, the interlocked actuating levers 3''', 5''' together with the screen protector 2''' are assembled to the base 1''', thus completing a preliminary assembly of the application device.

In the beginning, the first actuating lever 3''' and the actuating lever 5''' are respectively at their stop positions. Due to the limitation of the first connection portion 371''' and the second connection portion 571''', the first actuating lever 3''' and the second actuating lever 5''' are interlocked. It is required that the second actuating lever 5''' should be rotated to its actuation position, where the interlocking of the first and second actuating levers 3''', 5''' can be released, and then the subsequent operation of attaching the screen protector 2''' to a screen-mounted device by using the second actuating lever 5''' can be continued. After the second actuating lever 5''' has completed its attachment operation, the first actuating lever 3''' is allowed to be rotated for beginning with its attachment operation. In this embodiment, since the application device of this embodiment has only one reference point, the limitation of the first connection portion 371''' and the second connection 571''' provides the first and second actuating levers 3''', 5''' with a foolproof mechanism to prevent incorrect operation due to inadvertence.

In this embodiment, due to the distinctive features of the first controlled pivot portions 37''' and the second controlled pivot portions 57''', the first grooves 115''' and the second grooves 117''' are designed somewhat different from those of the previous embodiments, wherein the first and second grooves 115''', 117''' are arranged out of alignment; namely, the second grooves 117''' are vertically offset from the first grooves 115'''.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. An application device for installing a screen protector onto a display screen of a screen-mounted device, the screen protector defining at least one opening, the application device comprising:
  a base, which includes an accommodation for receiving the screen-mounted device, and a support for sustaining the accommodation, the accommodation extending in a longitudinal direction, the support defining at least a pair of first grooves which extends in the longitudinal direction and defining at least a pair of second grooves which are in parallel with the first grooves;
  a first actuating lever, which has:
  a pair of first controlled pivot portions being respectively guided and limited by the first grooves;
  a first arm formed integrally with the first controlled pivot portions at two ends thereof, the first arm having a body; wherein the first arm is capable of being rotated from a stop position to an actuation position, at a rotation angle greater than 90 degrees, about an axis formed by the first controlled pivot portions, and the first controlled pivot portions are capable of being forced to move along the first grooves when the first arm has reached its actuation position;
  a first pressing portion formed integrally with the first arm at two ends thereof which correspond to the first controlled pivot portions respectively; and
  a positioning protrusion formed on the body of the first arm for being inserted into the opening of the screen protector; and
  a second actuating lever, which has:
  a pair of second controlled pivot portions being respectively guided and limited by the second grooves;
  a second arm formed integrally with the second controlled pivot portions at two ends thereof, the second arm having a body capable of supporting the screen protector; wherein the second arm is capable of being rotated from a stop position to an actuation position, at a rotation angle greater than 90 degrees, about an axis formed by the second controlled pivot portions, and the second controlled pivot portions are capable of being forced to move along the second grooves when the second arm has reached its actuation position; and
  a second pressing portion formed integrally with the second arm at two ends thereof which correspond to the second controlled pivot portions respectively.

2. The application device of claim 1, wherein the base further includes a bottom plate located under the support thereof for supporting the support.

3. The application device of claim 1, wherein the first pressing portion has a contact surface and two downwardly curved surfaces at two opposite sides of the contact surface thereof, and the second pressing portion has a contact surface and two downwardly curved surfaces at two opposite sides of the contact surface thereof, so that the screen protector can be firmly attached to the screen-mounted device having a curved display screen.

4. The application device of claim 1, wherein when the second actuating lever is located at its actuation position, the first actuating lever is unable to be rotated to its actuation position.

5. The application device of claim 1, wherein the accommodation has a top surface; the support includes two opposite longer sides, which are parallel to the longitudinal direction, and two opposite shorter sides formed between the two opposite longer sides; at least one of the first and second controlled pivot portions is provided with a connection portion which allows the first and second arms, when at their respective stop positions, to be interlocked, wherein when the second arm is rotated to its actuation position, the interlocking between the first and second arms will be released.

6. The application device of claim 5, wherein each of the first grooves defines an exit close to one end of one of the short sides of the support; each of the second grooves defines an exit close to one end of the other one of the short sides of the support.

7. The application device of claim 5, wherein the second grooves are in level with the first grooves and thus are symmetrical with the first grooves about middle portions of the longer sides of the accommodation.

8. The application device of claim 1, wherein the second grooves are vertically offset from the first grooves.

9. A kit for protecting a display screen of a screen-mounted device, comprising:
  an application device, including:
  a base, which includes an accommodation for receiving the screen-mounted device, and a support for sustaining the accommodation, the accommodation being arranged in a longitudinal direction, the support defining at least a pair of first grooves which extends in the longitudinal direction and defining at least a pair of second grooves which are in parallel with the first grooves;
  a first actuating lever, which has:
  a pair of first controlled pivot portions being respectively guided and limited by the first grooves;
  a first arm formed integrally with the first controlled pivot portions at two ends thereof, the first arm having a body; wherein the first arm is capable of being rotated from a stop position to an actuation position, at a rotation angle greater than 90 degrees, about an axis formed by the first controlled pivot portions, and the first controlled pivot portions are capable of being forced to move along the first grooves when the first arm has reached its actuation position;
  a first pressing portion formed integrally with the first arm at two ends thereof which correspond to the first controlled pivot portions respectively; and
  a positioning protrusion formed on the body of the first arm;
  a second actuating lever, which has:
  a pair of second controlled pivot portions being respectively guided and limited by the second grooves;
  a second arm formed integrally with the second controlled pivot portions at two ends thereof, the second arm having a body; wherein the second arm is capable of being rotated from a stop position to an actuation position, at a rotation angle greater than 90 degrees, about an axis formed by the second controlled pivot portions, and the second controlled pivot portions are capable of being forced to move along the second grooves when the second arm has reached its actuation position; and
  a second pressing portion formed integrally with the second arm at two ends thereof which correspond to the second controlled pivot portions respectively; and
  at least one screen protector, which include:

a protective film extending in the longitudinal direction and including a film body layer and an adhesive layer disposed on one surface of the film body layer;

first and second backing sheets being attached to the protective film via the adhesive layer of the protective film without substantial overlap, the first and second backing sheets capable of being peeled off by the first and second actuating levers, respectively, to expose the adhesive layer of the protective film for allowing the protective film to be attached to the display screen of the screen-mounted device, and at least one opening for receiving the positioning protrusion of the first actuating arm, so that one portion of the screen protector can be fixed on the body of the first actuating arm while another portion of the screen protector can be supported by the body of the second actuating lever.

10. The kit of claim 9, wherein each of the first and second backing sheets is coated with a low-adhesion material layer.

11. The kit of claim 9, wherein when the second actuating lever is located at its actuation position, the first actuating lever is unable to be rotated to its actuation position.

12. The kit of claim 9, wherein the first pressing portion has a contact surface and two downwardly curved surfaces at two opposite sides of the contact surface thereof, and the second pressing portion has a contact surface and two downwardly curved surfaces at two opposite sides of the contact surface thereof, so that the screen protector can be firmly attached to the screen-mounted device having a curved display screen.

* * * * *